Feb. 5, 1924.

W. P. SHIPMAN

METHOD AND APPARATUS FOR WELDING

Filed April 23, 1921

1,482,818

INVENTOR.
Wm. P. Shipman
his attorney
Bakewell, Byrnes & Parmelee

Patented Feb. 5, 1924.

1,482,818

UNITED STATES PATENT OFFICE.

WILLIAM P. SHIPMAN, OF PITTSBURGH, PENNSYLVANIA, ASSIGNOR TO BLAW-KNOX COMPANY, OF PITTSBURGH, PENNSYLVANIA, A CORPORATION OF NEW JERSEY.

METHOD AND APPARATUS FOR WELDING.

Application filed April 23, 1921. Serial No. 463,918.

*To all whom it may concern:*

Be it known that I, WILLIAM P. SHIPMAN, residing at Pittsburgh, Allegheny County, Pennsylvania, have invented a new and useful Improvement in Methods and Apparatus for Welding, of which the following is a full, clear, and exact description.

My invention relates to method and apparatus for welding and is particularly applicable to hammer welding although not limited thereto.

The invention has ben found to be particularly useful in welding lifting lugs, for instance, to annealing boxes and other articles of that kind.

An object of this invention is to provide a means and method for welding members together, at least one of which has a weakened portion which would normally be subjected to the welding pressure producing means and which would be injured by such means, or would not efficiently transmit the welding pressure to the joint. My method and apparatus as hereinafter described, overcome this difficulty in a simple and efficient way.

In welding articles such as lifting lugs on annealing boxes or other similar structures, it was found that if these lugs were subjected to the welding pressure as applied in the ordinary manner, the weld was not as strong as necessary, and furthermore the lugs were considerably defaced or deformed, and in many instances rendered useless by the welding pressure.

By the method and apparatus hereinafter described, these difficulties have been overcome and a good joint insured. The working surfaces of the lugs are shielded or protected and are uninjured during the welding operation.

These and other objects will be better understood by reference to the following description taken in connection with the accompanying drawings which illustrate one embodiment of my invention, and means for carrying out the same and in which.

Figure 1:
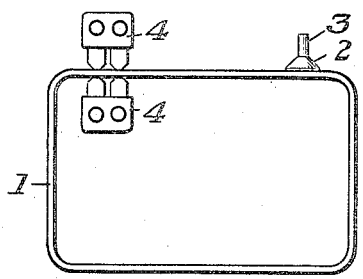
Figure 1 is a plan view of a structure having a lug welded thereon by my method.

My method will be understood by a description thereof as applied to the welding of lifting lugs to annealing boxes but I desire it to be understood that in this description I refer to the particular elements as illustrative only and not in a limiting sense, as there are many uses to which my method may be applied and in which the principles of the method and the apparatus may be employed although the apparatus and the articles to which the method is applied may vary greatly.

In the illustrated case of welding lugs to annealing boxes, it is of considerable importance that an efficient or perfect weld be made, as the welded joint is subjected to comparatively heavy strains. Therefore, the lugs have a flared or enlarged end for contacting with the box at the weld. The method consists in heating the lug and the box in the region of the weld to the desired temperature by any suitable means. The lug is then placed in contact with the box. The box, being usually of relatively thin sheet metal, is supported opposite the lugs. Means are then applied to the lug so as to protect the outer reduced or relatively weakened portion and the welding pressure, preferably produced by a hammer, is then applied only at points adjacent the weld. The pressure or hammering is continued until the weld is perfected and during the application of the welding pressure the reduced or weakened working portion of the lug is shielded from the pressure producing means by any suitable device.

One form of apparatus for carrying out the above process is shown in the drawings and will now be described:—

The box 1 may be of any suitable size or shape and the article to be welded thereto is illustrated as a lug having an enlarged or flared portion 2 and a relatively reduced portion 3. The box is heated by the heating device 4. Any other heating device may be used.

Figure 2:
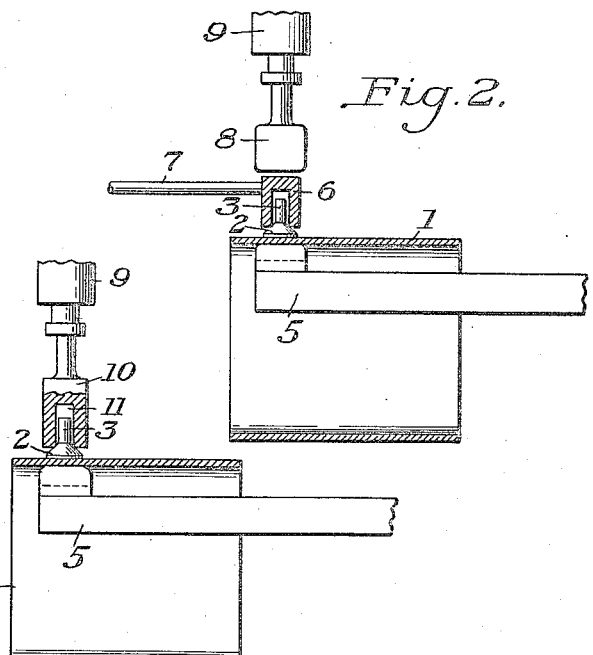
Figure 2 is a cross sectional view of an article showing also the apparatus for producing the weld.

Referring to Figure 2, after the box has been heated in the region of the weld, and the lug, which has also been heated, has been applied to the heated portion of the box, the box is supported opposite the lug by any suitable member such as that shown at 5. Placed over the portion 3 of the lug is a member 6, which has an opening therein slightly larger than the portion 3, and also deeper than the length of the portion 3 after the weld is completed. A handle 7 is provided for the member 6 for holding the same in place. The device 6—7 is referred to in the shop as a dolly. This dolly has a substantially flat upper portion which receives the welding pressure from the hammer 8 operated in the ordinary manner from a pneumatic cylinder 9.

Figure 4:
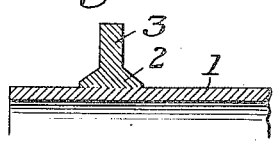
Figure 4 shows the same after being welded.
Figure 5:
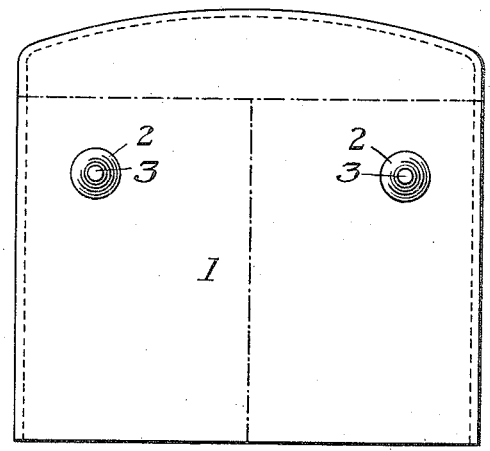
Figure 5 shows a side elevation with the lugs in place.

From the foregoing it will be apparent that the welding pressure is applied to the lug only at points adjacent the weld, or in other words, to the flared portion 2, and that the reduced portion 3 is shielded or protected by the dolly from the effect of the welding pressure. This insures that the working surface will not be deformed. Furthermore since the strength of the dolly is much greater than that of the portion 3, a more efficient transmission of the welding pressure will be secured, and the welding pressure therefore will be more directly applied to the weld than if such pressure were transmitted through the weakened portion 3. The dolly therefore serves the double function of protecting the working portion 3 and of more efficiently transmitting the welding pressure. It therefore results in a superior finished article having a better and stronger weld. In fact, the weld is so perfect that as shown in Figure 4 the lug is substantially integral with the member 1 to which it is welded.

Figure 6:
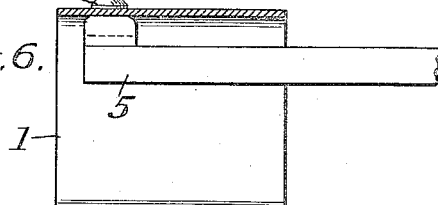
Figure 6 shows a modification of the apparatus for producing the weld.
Figure 3:
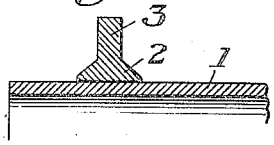
Figure 3 shows a lug in place ready for welding.

In Figure 6 I have illustrated a modified form of apparatus for transmitting the welding pressure to the joint. In Figure 2 a dolly is interposed between the hammer and the joint. In Figure 6 the hammer 10, as shown in partial section, is provided with an opening 11 into which the portion 3 of the lugs extends and the welding pressure from the hammer is therefore applied directly to the portion 2 of the lug by the hammer instead of through a dolly as in Figure 2.

The arrangement of Figure 2, however, is preferred inasmuch as the dolly with its handle 7 affords means for holding the lug in place until the weld is begun. Furthermore the arrangement of Figure 2 does not require as accurate centering of the hammer as does the arrangemnt of Figure 6. It will be understood, however, that the device shown in Figure 6 is useful and operative, although as above stated, it is not the preferred form. The hammer 10 is removable from the pneumatically operated piston so that hammers of other sizes or shapes may be substituted when desired.

From the foregoing it will be understood that my invention has many advantages. A perfect weld is produced because of the efficient transmission of the welding pressure to the joint; the lugs are protected against the deforming action of the welding pressure while at a welding temperature. The same means which shields the working portion acts also to hold the members in proper welding position to start the weld and the apparatus for carrying out the method is extremely simple and efficient in operation.

While I have described my invention with respect to a particular article, I wish it to be clearly understood that the principles of my method have a wide field of application and in fact it is applicable and useful in any instance where it is desired to protect a portion of the members being welded from the welding pressure producing means or where the parts would normally be required to transmit the welding pressure even though not of sufficient mechanical strength to efficiently do so.

Other and further advantages and uses of my invention will be appreciated without the necessity of setting forth the same specifically herein.

I claim:

1. In the method of welding metal members together while heated and in welding position, the step consisting in interposing a third member between the welding pressure producing means and the point of weld to transmit the welding pressure approximately to the point of weld and at a point intermediate the length of one of the members in the direction of welding pressure, substantially as described.

2. The method of hammer-welding a member to a relatively thin sheet, which consists in heating the member and the sheet in the region of the weld, placing the members together, supporting the sheet opposite the weld, interposing a rigid third member on the first member between the welding hammer and the joint for transmitting welding pressure to said member through less than its dimension in a direction at right angles to the plane of the weld, and hammering the third member, substantially as described.

3. The method of welding a lug having a flared head to a sheet which consists in heating the lug and the sheet in the region of the weld, placing said lug and sheet together, placing a rigid third member over the lug and in engagement with the flared head thereof, and hammering the third member, substantially as described.

4. The method of hammer-welding to a metal member a member having an outer working surface which would normally be subjected to the hammer blows, and injured thereby during the welding, which consists in heating the members, interposing a third member to shield the working surface from the hammer and transmit the blows to the joint through less than the dimension of the first member in the direction of welding pressure and hammering said third member, substantially as described.

5. The method of hammer-welding to a metal member lifting lugs having a relatively weakened outer portion which would be normally subject to the hammer blows and unable when hot to transmit the hammer blows to effect a weld without injury to said weakened portion, heating the members, interposing a third member for protecting said weakened portion and adapted to receive and transmit said hammer blows to points approximately at the joint, and hammering the third member, substantially as described.

6. In a method of welding requiring pressure between the members being welded, the step of utilizing a third member to apply the welding pressure approximately at the joint through less than the dimension of one of the members in the direction of the welding pressure, substantially as described.

7. A method of welding a member having a relatively weak portion which consists in interposing a third member between the pressure producing means and the weld for protecting said weak portion and transmitting said pressure to ensure a good weld, substantially as described.

8. The method of welding which consists in heating the members to be welded, placing said members in contact with each other, interposing means intermediate the outer portion of at least one of said members and the point of weld and applying welding pressure to said means to effect a weld, substantially as described.

9. The method of welding to a metal member a lug having an enlarged contact surface with said member and a relatively weak outer working portion, consisting in heating said lug and member and applying welding pressure to the enlarged portion only of the lug.

10. In a method of welding, the step which consists in shielding from deforming pressure a portion of one of the members being welded, which portion lies between the plane of the weld and the immediate source of applied welding pressure, substantially as described.

11. In the method of welding, the step consisting in applying the welding pressure through less than the entire thickness at the weld of at least one of the members being welded, substantially as described.

12. An implement for use in welding process comprising a handle and means for surrounding a portion of a member to be welded to transmit welding pressure around said portion at a point intermediate the length of the member in the direction of welding pressure, substantially as described.

13. Apparatus for welding members having portions normally subject to injury from welding pressure producing means, comprising pressure producing means, and means interposed between said last means and the joint for shielding said portions and efficiently transmitting said pressure to the joint through less than the entire dimension of one of the members in the direction of welding pressure, substantially as described.

14. Hammer welding apparatus comprising a hammer, means supporting the members to be welded, and a third member adapted to be interposed between said hammer and the joint to apply the blows of said hammer to points adjacent said joint through less than the entire dimension of one of the members in the direction of welding pressure, substantially as described.

15. In welding apparatus, pressure producing means, and means between said pressure means and the members being welded for relieving that portion of the members being welded which extends between the joint and the pressure producing means from the effect of said pressure producing means, substantially as described.

16. The method of welding the end of a member to a second member which consists in heating the parts to be welded and shielding from the pressure producing means all of that part of the first member except the part at and near the joint, substantially as described.

17. In the method of welding a member to a surface, the step consisting in applying the welding pressure to said member at a point intermediate its ends in the line of pressure, substantially as described.

18. In the method of welding a member to a surface, the step consisting in applying the welding pressure to said member at a point spaced from said surface less than the dimension of said member in the line of pressure, substantially as described.

19. In the method of welding a member to a surface, the steps consisting in protecting a portion of said member against deformation and applying welding pressure to another portion of said member while so protected, substantially as described.

In testimony whereof I have hereunto set my hand.

WILLIAM P. SHIPMAN.